United States Patent
Nachimuthu et al.

(10) Patent No.: US 11,972,243 B2
(45) Date of Patent: Apr. 30, 2024

(54) MEMORY DEVICE FIRMWARE UPDATE AND ACTIVATION WITHOUT MEMORY ACCESS QUIESCENCE

(71) Applicant: SK Hynix NAND Product Solutions Corp., Rancho Cordova, CA (US)

(72) Inventors: Murugasamy K. Nachimuthu, Beaverton, OR (US); Mohan J. Kumar, Aloha, OR (US); Muthukumar P. Swaminathan, Folsom, CA (US); Daniel K. Osawa, Tigard, OR (US); Maciej Plucinski, Hillsboro, OR (US)

(73) Assignee: SK Hynix NAND Product Solutions Corp., Rancho Cordova, CA (US)

(*) Notice: Subject to any disclaimer, the term of this patent is extended or adjusted under 35 U.S.C. 154(b) by 707 days.

(21) Appl. No.: 17/031,012

(22) Filed: Sep. 24, 2020

(65) Prior Publication Data

US 2021/0011706 A1 Jan. 14, 2021

(51) Int. Cl.
*G06F 8/65* (2018.01)
*G06F 3/06* (2006.01)
*G06F 21/44* (2013.01)

(52) U.S. Cl.
CPC .............. *G06F 8/65* (2013.01); *G06F 3/0602* (2013.01); *G06F 3/0629* (2013.01); *G06F 3/0671* (2013.01); *G06F 21/44* (2013.01)

(58) Field of Classification Search
None
See application file for complete search history.

(56) References Cited

U.S. PATENT DOCUMENTS 9,274,789 B2 * 3/2016 Yuan ...................... G06F 8/656
10,152,264 B1 12/2018 Butcher et al.
(Continued)

OTHER PUBLICATIONS

Dumais Alex: Online Firmware Updates in Timing-Critical Applications n , Microchip Technology Inc, Jan. 1, 2018 (Jan. 1, 2018), pp. 1-36, XP055851781, Retrieved from the Internet: URL:https://ww1.microchip.com/downloads/en/Appnotes/Live%20Update%20Application%20Note.pdf.
(Continued)

*Primary Examiner* — Marina Lee
(74) *Attorney, Agent, or Firm* — HALEY GUILIANO LLP

(57) ABSTRACT

Examples include updating firmware for a persistent memory module in a computing system during runtime. Examples include copying a new version of persistent memory module firmware into an available area of random-access memory (RAM) in the persistent memory module, and transferring processing of a current version of persistent memory module firmware to the new version of persistent memory module firmware during runtime of the computing system, without a reset of the computing system and without quiesce of access to persistent memory media in the persistent memory module, while continuing to perform critical event handling by the current version of persistent memory module firmware. Examples further include initializing the new version of persistent memory module firmware; and transferring processing of critical event handling from the current version of persistent memory module firmware to the new version of persistent memory module firmware when initializing the new version of persistent memory module firmware is completed.

25 Claims, 15 Drawing Sheets

(56) References Cited

U.S. PATENT DOCUMENTS

| | | |
|---|---|---|
| 11,106,457 B1* | 8/2021 | Subramanian .......... G06F 8/656 |
| 11,347,429 B2* | 5/2022 | Frolikov ............. G06F 9/44505 |
| 2009/0007089 A1* | 1/2009 | Rothman .................. G06F 8/65 |
| | | 717/168 |
| 2019/0243637 A1 | 8/2019 | Nachimuthu et al. |
| 2022/0100489 A1* | 3/2022 | Hung .................... G06F 9/4401 |

OTHER PUBLICATIONS

International Search Report & Written Opinion for International Application No. PCT/US21/44716 dated Oct. 27, 2021, 17 pages.

\* cited by examiner

MEMORY DEVICE FIRMWARE UPDATE AND ACTIVATION WITHOUT MEMORY ACCESS QUIESCENCE

BACKGROUND

The field of invention relates generally to updating firmware in memory modules in computer systems, and, more specifically, to updating and activating firmware in memory modules without memory access quiescence.

Three-dimensional (3D) cross-point memory (3D XPoint) (also called persistent memory (PMEM)) is a byte-addressable, write-in-place non-volatile memory (NVM) technology commercially available from Intel® Corporation as Optane™ and from Micron Corporation as QuantX™ memory, which may be packaged in a persistent memory module, for example, a Data Center Persistent Memory Module (DCPMM) (Optane™ DC Persistent Memory). DCPMM provides persistent memory and volatile memory and, in conjunction with processor technologies, a persistent memory system can support multiple memory modes such as one level memory (1LM), Memory Mode (MM), App-Direct and App-Direct-Write-Back. Users of 3D) (Point products in computer server systems (such as cloud service providers (CSPs)) would like to upgrade firmware in persistent memory modules to apply bug fixes, apply workarounds, and add telemetry to debug and/or determine root cause issues, without rebooting the computer server systems to reduce service interruptions to meet Service Level Agreements (SLAs) with their end customers. In an earlier generation of persistent memory technology, the computer server system was required to be rebooted in order to upgrade the firmware in persistent memory modules. This resulted in system downtime, which in many cases was unacceptable. In a succeeding generation of persistent memory technology, a runtime firmware upgrade capability was provided that does not require rebooting the server system. This persistent memory technology requires memory access to be quiesced for a period of time (e.g., 300 milliseconds, 500 milliseconds, etc.) to activate the new firmware in a persistent memory module. However, in contemporary computer server systems, Peripheral Component Interconnect express (PCIe) devices are typically configured with a PCIe completion timeout (PCIe CTO) of 50 microseconds (usec) to 50 msec. Some computing systems using PCIe devices do not support a PCIe completion timeout of more than 10 milliseconds (msec). Quiescing memory access for a longer period of time during a runtime firmware upgrade in a persistent memory module results in a PCIe I/O device completion timeout and operating system (OS) service timeout. These errors negatively impact system performance. Additionally, widely deployed OSs such as Windows® and Linux™ support stopping direct memory access (DMA) operations of I/O devices during runtime to activate new firmware. Thus, a mechanism to update memory device firmware without quiescing memory access is needed.

DETAILED DESCRIPTION

Figure 1:
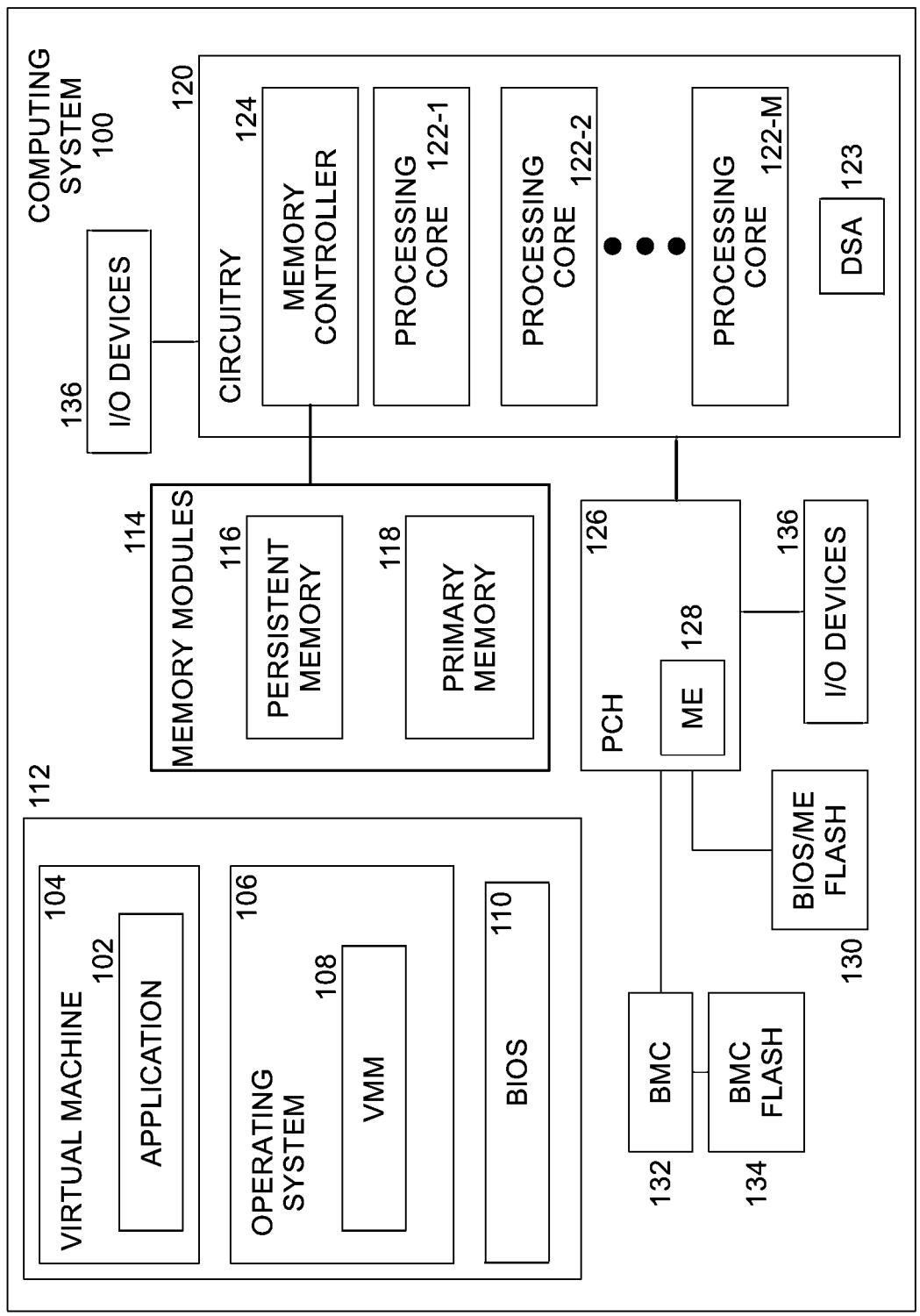
FIG. 1 illustrates an example computing system according to some embodiments.

Embodiments of the present invention comprise a persistent memory module that provides for the upgrade of persistent memory module firmware without memory quiesce. Embodiments of the present invention provide a mechanism for platform firmware and the OS to cause the upgrade of persistent memory module firmware without a system reset, without memory access quiesce, and without incurring I/O device completion timeouts. This enables CSPs to deploy runtime firmware upgrades in their server systems without reboots, resulting in improved quality of service (QoS) by fixing bugs, installing workarounds, managing reliability, availability and serviceability (RAS) solutions, and enabling better debugging operations and root cause determinations in persistent memory devices.

Embodiments allow computing systems to keep current firmware critical services running during a new firmware copy operation from flash memory to RAM (e.g., static RAM (SRAM) or dynamic RAM (DRAM)) on a persistent memory module and during early stages of new firmware initialization. Embodiments dynamically transfer processing from a current firmware version to a new firmware version without a system reset and without memory access quiesce. In embodiments, the new firmware version takes control of critical service processing from the current firmware version by disabling interrupts, "back pressuring" memory access, loading a new firmware interrupt descriptor table (IDT), and enabling interrupts and media access.

Additionally, embodiments are self-contained within the persistent memory module. Hence, they do not require processor support for quiesce, basic input/output system (BIOS)/baseboard management controller (BMC) compatibility (and increased complexity), and operating system (OS) support for stopping direct memory access (DMA) operations. This reduces costs for firmware update solutions by reducing overhead for implementation, validation, enabling, maintenance and support. In embodiments, the persistent memory module advertises the firmware upgrade capability without requiring quiesce. The interface between the OS and the persistent memory module provides a mechanism to stage the new firmware version and activate the new firmware version without any additional processor, I/O, or OS constraints.

In one embodiment, platform firmware (e.g., BIOS (which may be compliant with the Unified Extensible Firmware Interface (UEFI) Specification v2.8A, February 2020, or predecessor or successor versions)) publishes persistent memory module firmware upgrade capability information to the OS along with an estimated firmware activation time. Once the new firmware for a persistent memory module is written to the persistent memory module, the OS calls the platform firmware to activate the new firmware in the persistent memory module. After the platform firmware completes the activation of the persistent memory modules, the OS restores services (e.g., reevaluating interrupts, reevaluating timers and restarting I/O services, etc.) to continue server system operation.

FIG. 1 illustrates an example computing system 100. According to some examples, computing system 100 includes circuitry 120, memory modules 114 including one or more primary memory modules 118 and one or more persistent memory modules 116 coupled to circuitry 120, and a platform control hub (PCH) 126. PCH 126 includes management engine (ME) 128 (such as ME-SPS) and is coupled to BMC 132 (which in turn is coupled to BMC flash memory 134), BIOS/ME flash memory 130, and one or more I/O devices 136. In some embodiments, I/O devices 136 are coupled to circuitry 120 and these I/O devices may read data from and write data to memory devices 114 without using PCH 126.

Computing system 100 includes software being executed such as operating system (OS) 106, virtual machine manager (VMM) (also known as a hypervisor) 108, at least one application 102 (running in a virtual machine (VM) 104 in one embodiment). In one embodiment, OS 106 is any variant of Linux™. In another embodiment, OS 106 is Windows® Server. Other OSs may also be used (e.g., Apache hypertext transport protocol (HTTP) server available from the Apache Software Foundation, etc.). OS 106 interacts with BIOS 110.

In at least one embodiment, I/O devices 136 may be one or more of hard disk drives (HDDs) and/or solid-state drives (SSDs). In an embodiment, I/O devices 136 include non-volatile memories (NVMs). In some examples, circuitry 120 may communicatively couple to other system components via a PCIe bus (not shown) conforming to version 3.0 or other versions of the PCIe standard published by the PCI Special Interest Group (PCI-SIG). In some examples, OS 106, VMM 108, VM 104, and application 102 are implemented, at least in part, via cooperation between one or more memory modules 114 (including persistent memory module 116 and/or primary memory module 118), I/O devices 136 (whether coupled to PCH 126 or circuitry 120), and elements of circuitry 120 such as memory controller 124 and processing cores 122-1 to 122-$m$, where "m" is any positive whole integer greater than 2. In an embodiment, OS 106, VMM 108, VM 104 and application 102 are executed by one or more processing cores 122-1 to 122-$m$.

In some examples, computing system 100, includes but is not limited to a server, a server array or server farm, a web server, a network server, an Internet server, a work station, a mini-computer, a main frame computer, a supercomputer, a network appliance, a web appliance, a distributed computing system, multiprocessor systems, processor-based systems, a laptop computer, a tablet computer, a smartphone, a system-on-a-chip (SoC), or a combination thereof. In one example, computing system 100 is a disaggregated server. A disaggregated server is a server that breaks up components and resources into subsystems (e.g., network sleds). Disaggregated servers can be adapted to changing storage or compute loads as needed without replacing or disrupting an entire server for an extended period of time. A server could, for example, be broken into modular compute, I/O, power and storage modules that can be shared among other nearby servers.

Circuitry 120 having memory controller 124 and processing cores 122-1 to 122-$m$ may include various commercially available processors, including without limitation, Intel® Atom®, Celeron®, Core (2) Duo®, Core i3, Core i5, Core i7, Itanium®, Pentium®, Xeon® or Xeon Phi® processors, ARM processors, processors from Applied Micro Devices (AMD) Incorporated, and similar processors. In one embodiment, circuitry 120 includes only one processing core. In an embodiment, circuitry 120 includes driver and support assistance (DSA) engine 123. In an embodiment, processing cores 122 include support for memory traffic quiesce and BMC 132 to initiate quiesce and un-quiesce operations through out-of-band (OOB) access mechanisms (e.g., $I^2C$ or platform environment control interface (PECI)).

According to some examples, primary memory module 118 may be composed of one or more memory devices or dies which may include various types of volatile and/or non-volatile memory. Volatile types of memory may include, but are not limited to, dynamic random-access memory (DRAM), static random-access memory (SRAM), thyristor RAM (TRAM) or zero-capacitor RAM (ZRAM). Non-volatile types of memory may include byte or block addressable types of non-volatile memory having a 3-dimensional (3-D) cross-point memory structure that includes chalcogenide phase change material (e.g., chalcogenide glass) hereinafter referred to as "3-D cross-point memory". Non-volatile types of memory may also include other types of byte or block addressable non-volatile memory such as, but not limited to, multi-threshold level NAND flash memory, NOR flash memory, single or multi-level phase change memory (PCM), resistive memory, nanowire memory, ferroelectric transistor random access memory (FeTRAM), magneto-resistive random-access memory (MRAM) that incorporates memristor technology, spin transfer torque MRAM (STT-MRAM), or a combination of any of the above. In another embodiment, primary memory module 118 may include one or more hard disk drives within and/or accessible by computing platform 101.

In an embodiment, persistent memory module 116 includes a byte-addressable non-volatile memory (NVM). Non-volatile types of memory may include byte or block addressable types of non-volatile memory having a 3D) XPoint memory structure that includes chalcogenide phase change material (e.g., chalcogenide glass). Non-volatile types of memory may also include other types of byte or block addressable non-volatile memory such as, but not limited to, multi-threshold level NAND flash memory, NOR flash memory, single or multi-level phase change memory (PCM), resistive memory, nanowire memory, ferroelectric transistor random access memory (FeTRAM), magneto-resistive random-access memory (MRAM) that incorporates memristor technology, spin transfer torque MRAM (STT-MRAM), or a combination of any of the above. In an embodiment, persistent memory modules provide OOB (e.g., $I^2C$ or PECI) access to activate firmware while all primary memory traffic is quiesced.

Figure 2:
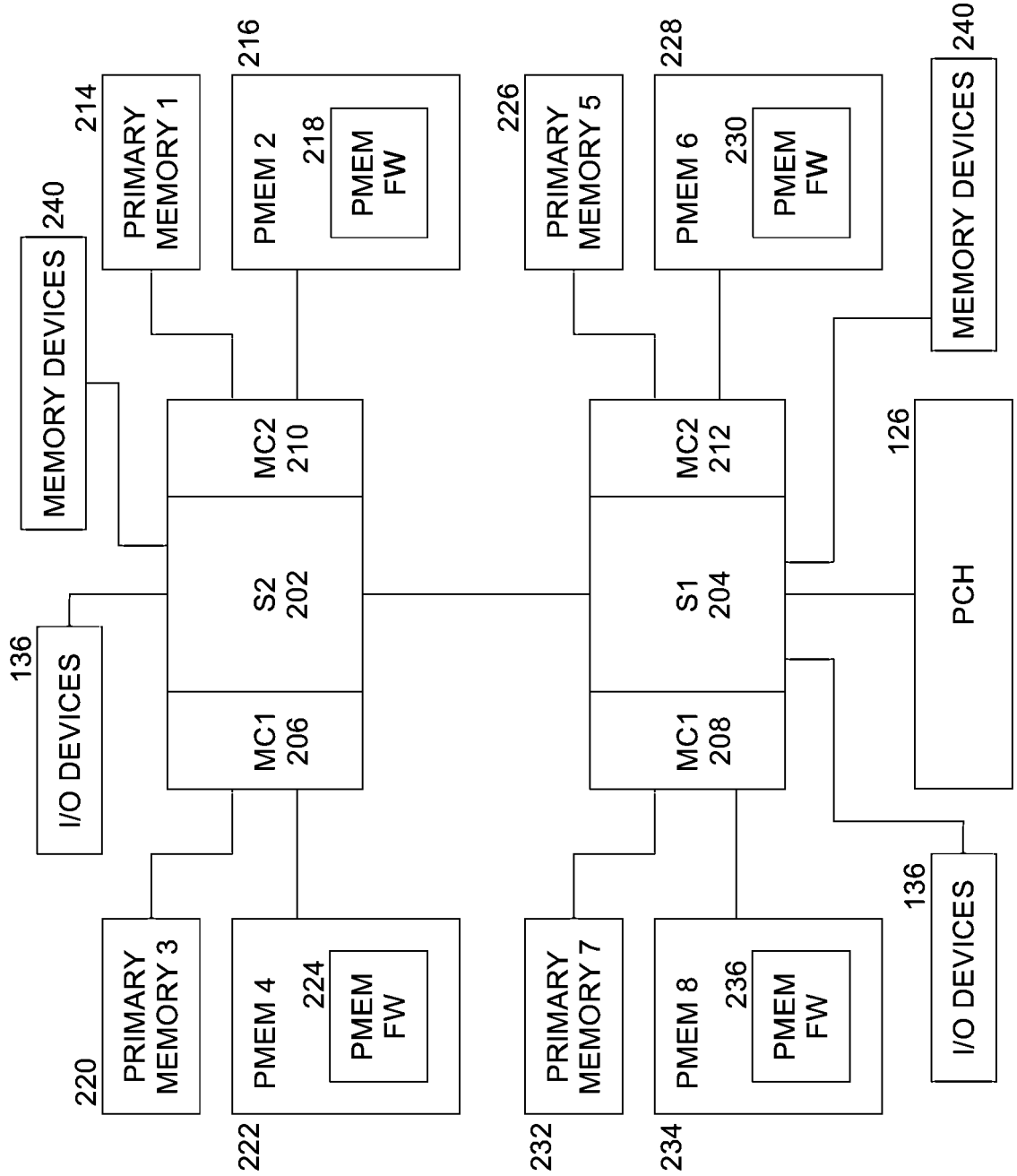
FIG. 2 illustrates an example computing system according to some embodiments.

FIG. 2 illustrates example computing system 200 according to some embodiments. In this example, computing system 200 includes two processor sockets S1 204 and S2

202, although in other examples other numbers of processor sockets may be used. Socket S2 202 is coupled to two memory controllers MC1 206 and MC2 210, zero or more I/O devices 136, and zero or more memory devices 240. MC2 210 is coupled to at least one primary memory 1 214 and at least one persistent memory module (PMEM) 2 216. PMEM 2 216 includes PMEM FW 218. Similarly, MC1 206 is coupled to at least one primary memory module 3 220 and at least one PMEM 4 222. PMEM 4 222 includes PMEM FW 224. Socket S1 204 is coupled to two memory controllers MC1 208 and MC2 211, zero or more I/O devices 136, zero or more memory devices 240, and PCH 126. MC2 212 is coupled to at least one primary memory module 5 226 and at least one PMEM 6 228. PMEM 6 228 includes PMEM FW 230. Similarly, MC1 208 is coupled to at least one primary memory module 7 232 and at least one PMEM 8 234. PMEM 8 234 includes PMEM FW 236. In one embodiment, PMEM FW 218, PMEM FW 224, PMEM FW 230, and PMEM FW 236 are identical. In one embodiment, MC1 206 and MC1 208 are identical. In one embodiment MC2 210 and MC2 212 are identical. In other embodiments, other numbers of memory controllers, primary memory modules, sockets, channels, persistent memory modules, memory controllers per socket, channels per memory controller, and memories per channel may be used. In another embodiment, one or more memory controllers are resident on an I/O device. In one embodiment, memory devices 240 include one or more of persistent memory modules 116 such as an Intel® Optane™ DCPMM (PMEM). In another embodiment, memory devices 240 include one or more PMEMs attached using a compute express link (CXL) (either directly attached or through a pool).

Access to the memory modules (including primary memory modules 214, 220, 226, and 232 and persistent memory modules 216, 222, 228, and 234) may be interleaved between these memory modules or may be operated without interleaving. In some embodiments, one or more memory modules act as caching memory for other memory modules. In one embodiment, each persistent memory module (such as PMEM 2 216, PMEME 4 222, PMEM 6 228, and/or PMEM 8 234) includes a persistent memory module controller (not shown) with PMEM FW that supports memory link initialization, error handling, power failure handling, persistent memory accesses, wear leveling, read/write disturb, self-monitoring, analysis, and reporting technology (SMART) information, security management, telemetry, RAS handling, etc.

Embodiments of the present invention provide a mechanism to upgrade the PMEM FW at run time without reboot, without memory access quiesce, and with no or minimal service impact.

Figure 3:
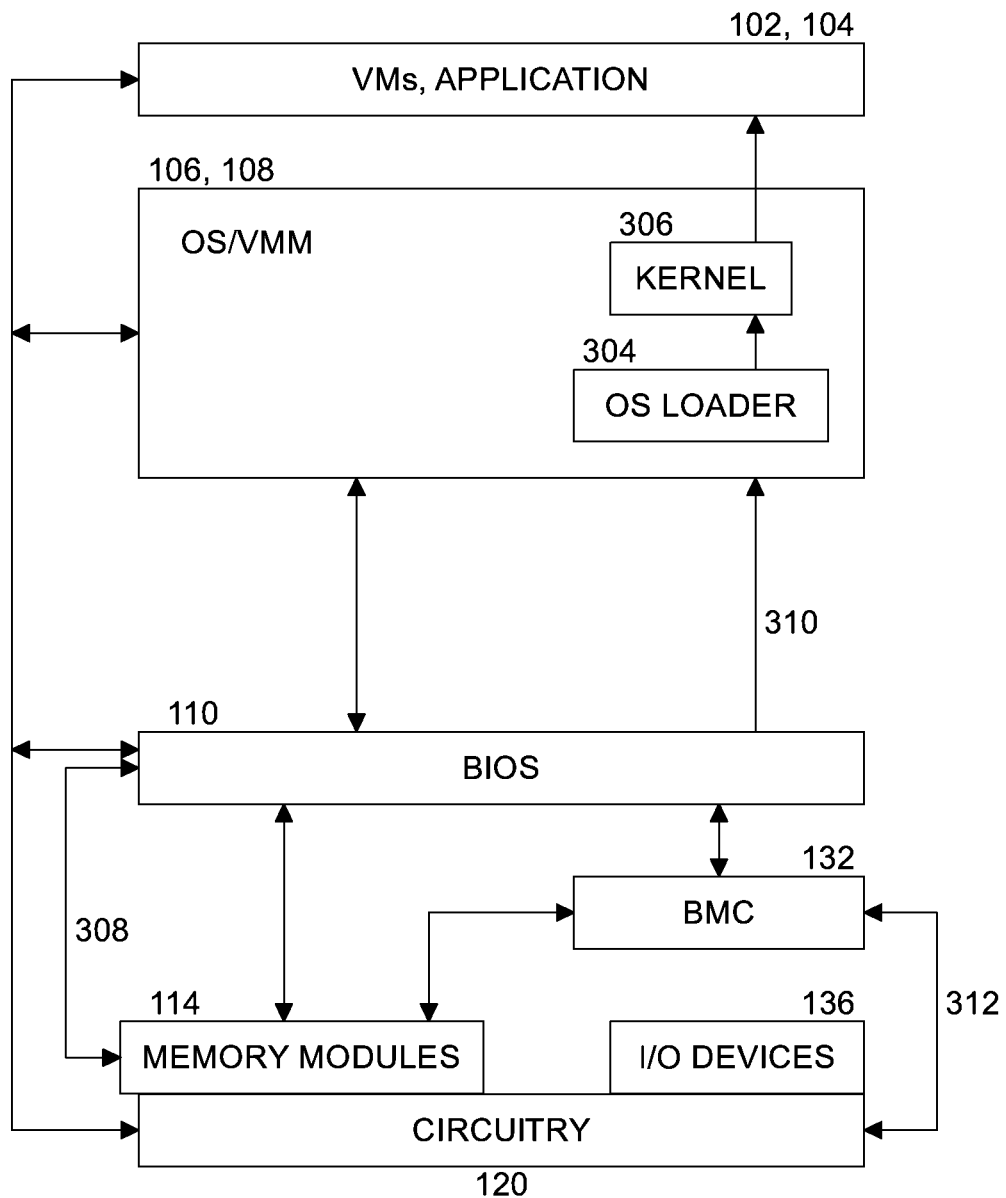
FIG. 3 is a diagram illustrating persistent memory module firmware upgrade interfaces according to some embodiments.

FIG. 3 is a diagram 300 illustrating persistent memory module firmware upgrade interfaces according to some embodiments. VMs 104 and application 102 interact with OS 106 and VMM 108. OS 106 includes OS loader 304 and kernel 306. OS 106 and VMM 108 interact with BIOS 110. BIOS 110 interacts with memory modules 114 and BMC 132. Processing cores 122 are coupled with memory modules 114 and I/O devices 136. In an embodiment, memory modules 114 provide an interface 308 for platform firmware (BIOS 110 and/or BMC 132) and OS 106 to determine the capabilities of the memory modules including estimated activation time requirements and a mechanism to activate the firmware (PMEM FW) in persistent memory modules 116. In an embodiment, BIOS 110 provides an interface 310 (such as Advanced Configuration and Power Interface (ACPI) device specific methods (DSMs), an ACPI Platform Communication Channel (PCC), through a Unified Extensible Firmware Interface (UEFI) runtime service interface, through a Compute Express Link (CXL) register interface, or through a Peripheral Component Interconnect Express (PCIe) register interface) for OS 106 to upgrade the firmware in persistent memory modules 116 including a platform firmware support capability to support PMEM FW activation, estimated activation time, and activation of the updated PMEM FW. In an embodiment, BMC 132 provides an interface 312 to circuitry 120 (including memory controller 124 and processing cores 122) to activate the PMEM FW.

Based on memory module interface 308 and BIOS interface 310, OS 106 determines platform and firmware capabilities, loads PMEM FW on persistent memory modules 116, and calls the BIOS to activate the PMEM FW.

Figure 4:
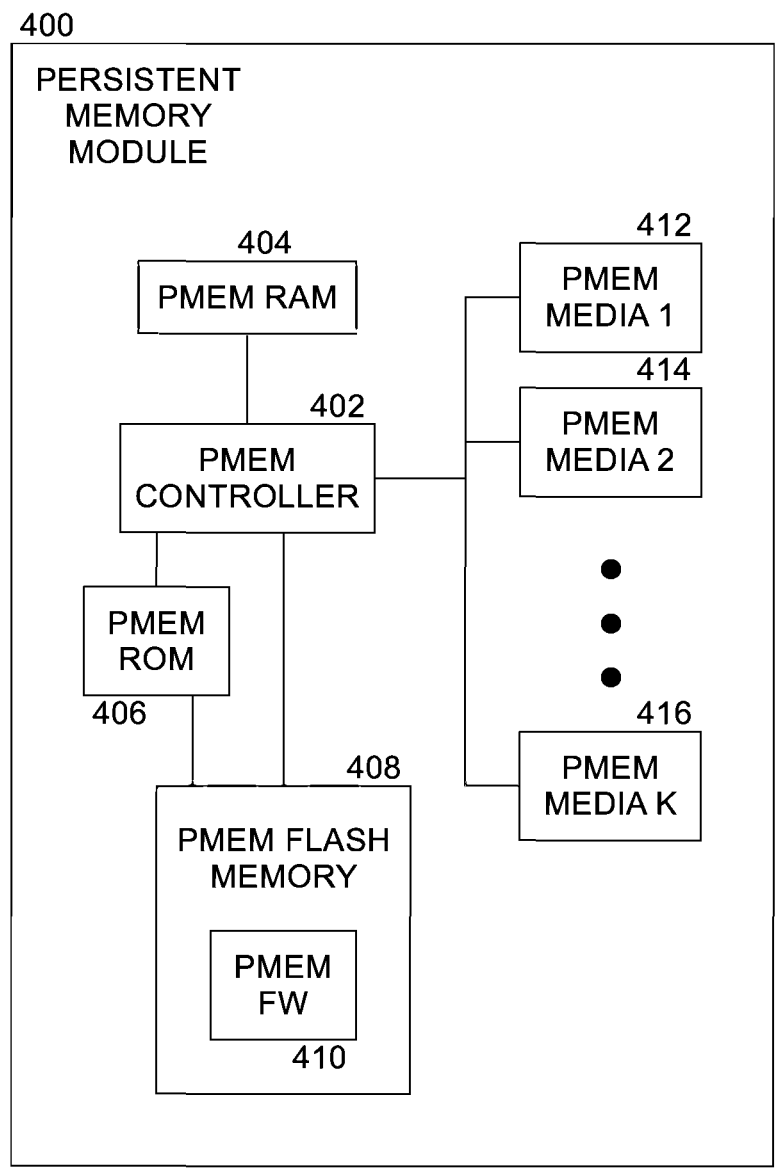
FIG. 4 illustrates an example persistent memory module according to some embodiments.

FIG. 4 illustrates an example persistent memory module 400 according to some embodiments. Persistent memory module 400 (PMEM) is representative of persistent memory 116 of FIG. 1, and PMEM 2 216, PMEM 4 222, PMEM 6 230, and PMEM 8 234 of FIG. 2. PMEM 400 includes a PMEM controller 402 with connections to PMEM flash memory 408, PMEM RAM 404, PMEM ROM 408, and one or more PMEM media components such as PMEM media 1 412, PMEM media 2 414, . . . PMEM media K 416, where K is a natural number. PMEM flash memory stores one or more versions of PMEM FW 410. PMEM FW 410 is loaded into PMEM RAM 404 from PMEM flash memory for PMEM controller 402 to execute PMEM FW 410. In an embodiment, PMEM media 1 412, PMEM media 2 414, . . . PMEM media K 416 are Intel® Optane™ 3D XPoint™ memory media. In an embodiment, PMEM 400 is also coupled to an external interface (not shown in FIG. 4) supporting a DDR-T communications protocol or CXL and an internal interface (not shown in FIG. 4) to the memory media. PMEM 400 may contain an immutable ROM code 406 for performing security authentication before copying PMEM FW 410 to PMEM RAM 404.

PMEM FW 410 capabilities include performing Build in Self-Test (BIST), checking memory media health, initializing a processor to memory device interface connection (such as a DDR-T or CXL link), performing memory media management such as wear leveling, read/write disturb, error handling, power loss handing, throttling, security, SMART (Self-Monitoring, Analysis and Reporting Technology) handling, providing external interface for system interactions, etc. Due to the variety of the functions handled by PMEM FW 410, PMEM FW 410 may have bugs or performance and security issues after computing system 100 is released that may require fixes in the PMEM FW. Additionally, in order to debug and determine root cause issues a firmware upgrade may be required. Memory module customers (such as Cloud Service Providers (CSPs)) require that firmware updates are seamless, meaning the ability deploy firmware without performing a system reset or without service timeouts to meet their Service Level Agreements (SLAs). In cases without embodiments of the present invention, the CSPs are not able to migrate the workloads or it is too time consuming to allow computing system 100 to reboot for newly upgraded firmware to take effect.

Figure 5:
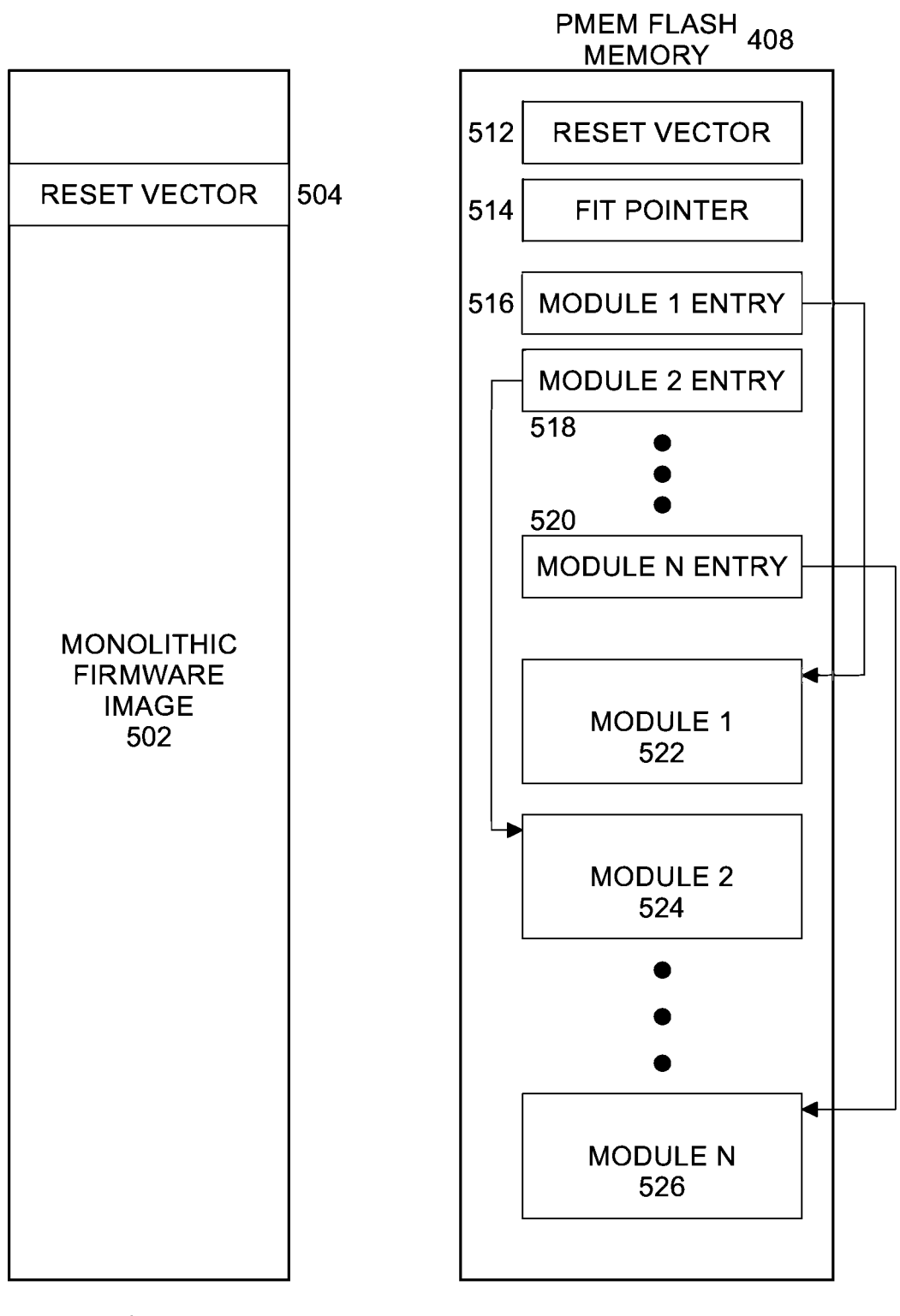
FIG. 5 illustrates an example firmware interface table (FIT) in a flash memory according to an embodiment.

FIG. 5 illustrates an example firmware interface table (FIT) in a flash memory according to an embodiment. In prior art systems, memory device firmware is typically represented as a monolithic firmware image 502. A reset vector 504 is an entry point for the monolithic firmware image 502. In embodiments of the present invention, instead of being a monolithic firmware image, PMEM FW 410 is represented as a plurality of PMEM FW modules stored in PMEM flash memory 408. PMEM FW 410 is still accessed initially by reset vector 512, but firmware interface table (FIT) pointer 514 may be used by PMEM controller 402 to access a plurality of PMEM FW modules as needed. In an embodiment, the FIT is a data structure inside PMEM flash memory 408 and consists of multiple entries. Each entry defines the starting address and attributes of different modules of the PMEM FW in the PMEM flash memory. In an embodiment, the FIT is located at a predetermined location in PMEM flash memory 408 and the FIT contains a table of pointers. Each pointer points to a module with an identifier to indicate the type of module (for example, boot module (DIMM initialization), security module, critical runtime module (including error handling, shutdown handling, etc.), and a non-critical runtime module (including policy/configuration change management, etc.). For example, the FIT in PMEM Flash memory 408 may include a plurality of module entry pointers 516, 518, . . . 520, each module entry pointer pointing to a respective module in the PMEM flash memory (e.g., module 1 entry 516 points to module 1 522, module 2 entry 518 points to module 2, . . . module N entry 520 points to module N 526, where N is a natural number). Different combinations of one or more modules may be loaded into PMEM RAM 404 by PMEM controller 402 as needed. In an embodiment, there may be any number of PMEM FW images (comprising any number of modules) stored in PMEM flash memory. Any individual module PMEM flash memory 408 may be changed/updated/upgraded at any time without having to change all modules in a complete PMEM FW image (e.g., each firmware module is independently updateable). In some embodiments, some modules may be included in multiple complete PMEM FW images (e.g., PMEM controller 402 can "mix and match" modules as needed).

Figure 6:
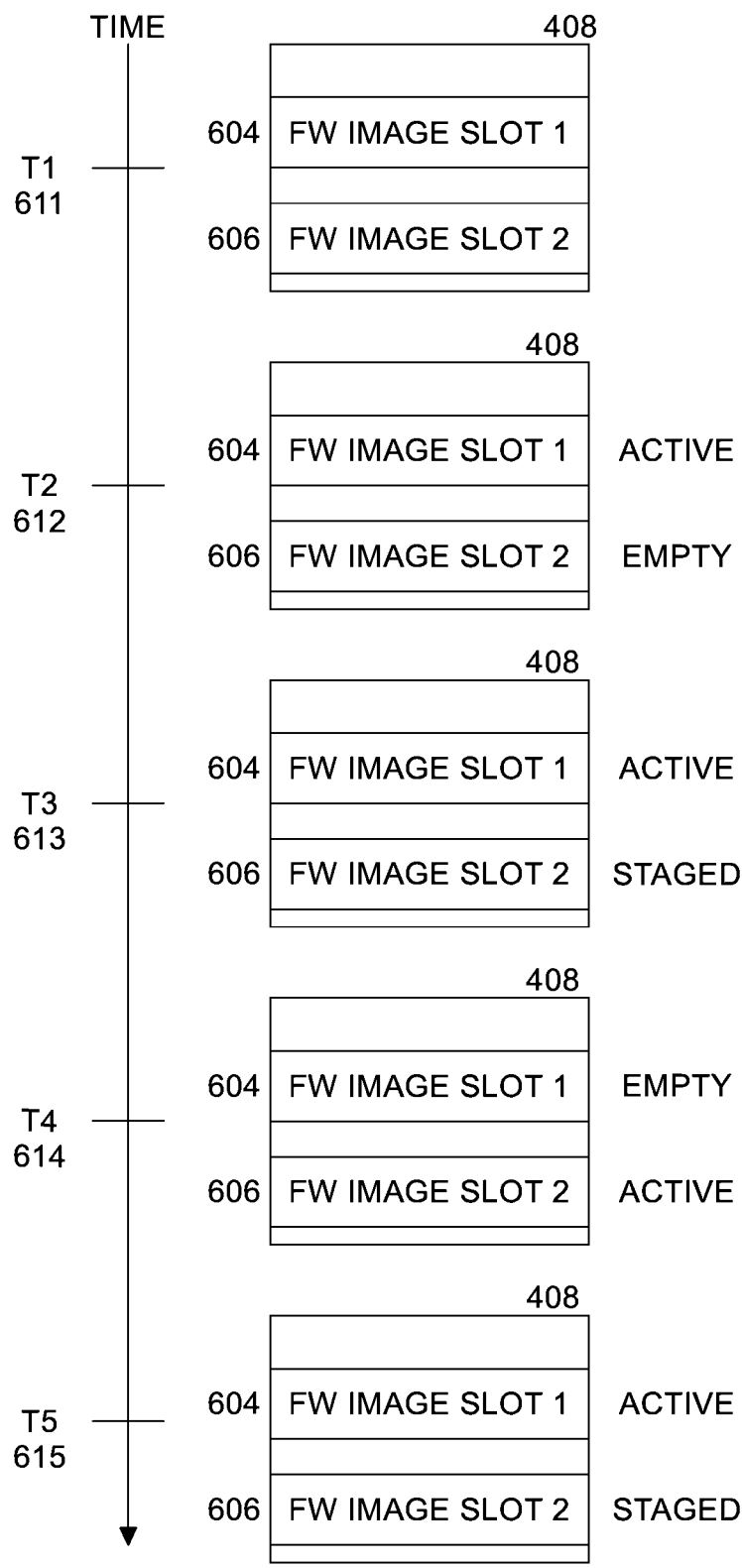
FIG. 6 is a diagram of persistent memory module flash memory changes over time processing according to another embodiment.

FIG. 6 is a diagram of persistent memory module flash memory changes over time processing according to another embodiment. FIG. 6 illustrates staging and activation of PMEM FW images over time. In an embodiment, PMEM flash memory 408 includes two PMEM FW image slots, such as FW image slot 1 64 and FW image slot 2 606. In other embodiments, any number of FW image slots may be used, and FW image slots may be reused in any combination. For example, at time T1 611, both FW image slots shown are not in use. At time T2 612, PMEM FW 410 stored in FW image slot 1 604 has a state of active (e.g., the FW stored in FW image slot 1 604 is being used by PMEM controller 402 to operate PMEM 400). Also, at time T2 612, FW image slot 2 606 has a state of empty (e.g., available for loading a PMEM FW image). At time T2 612, FW image slot 2 606 is not being used by PMEM controller 402 to operate PMEM 400. When one or more new FW modules are to be upgraded, the new modules are "staged" (e.g., copied into PMEM flash memory 408). Thus, at time T3 613, while FW image slot 1 604 is still active, FW image slot 2 606 has a state of staged (since the one or more new PMEM FW modules are in the process of being copied into PMEM flash memory). Once the one or more new PMEM FW modules are copied, at time T4 614 PMEM controller 402 may switch to using the PMEM FW in FW image slot 2 606. Thus, the state of FW image slot 2 606 is now active, and the state of FW image slot 1 604 is now empty. This process may be repeated (as shown at time T5 615). In this way FW image slots in PMEM flash memory 408 may be used to store PMEM FW modules in conjunction with PMEM controller 402 accessing the FW image slots as needed. In some embodiments, the PMEM FW could be staged at both a PMEM flash area and a PMEM RAM area to reduce firmware copy overhead from flash memory during PMEM FW activation.

Embodiments of the present invention provide multiple techniques for upgrading PMEM FW without memory access quiescence.

Figure 7:
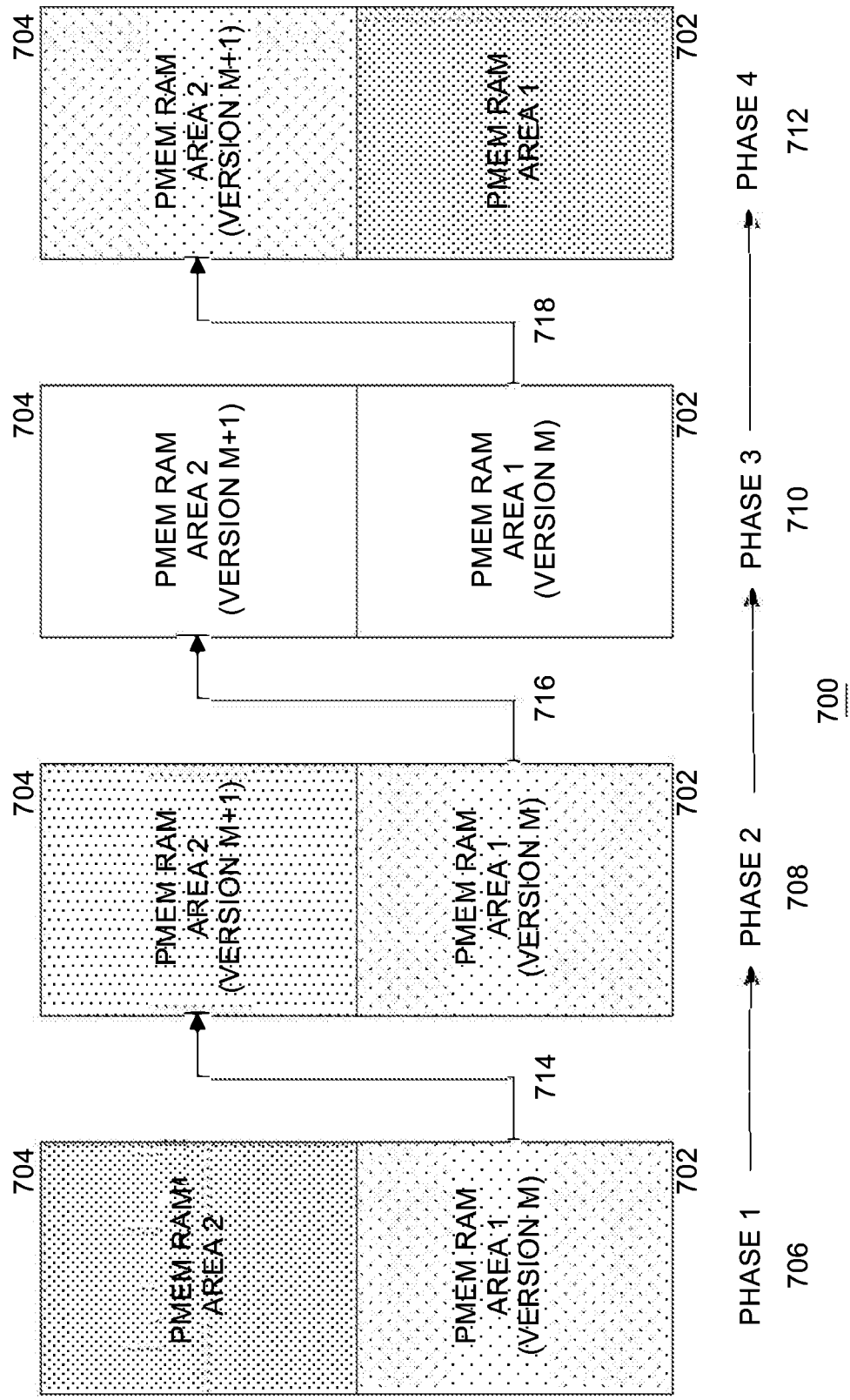
FIG. 7 is a diagram of persistent memory module random-access memory (RAM) changes over time according to some embodiments.

In one embodiment, the size of the total available space in PMEM RAM 404 is more than twice the size of PMEM FW 410 (including all PMEM FW modules constituting the PM FW image). FIG. 7 is a diagram 700 of persistent memory module random-access memory (RAM) changes over time according to this embodiment. During phase 1 706, a version M of PMEM FW 410 is loaded into area 1 702 of PMEM RAM 404 and is executed by PMEM controller 402 to operate PMEM 400. During phase 1 706, area 2 704 of PMEM RAM 404 is unused. During a transition from phase 1 706 to phase 2 708, a new version M+1 of PMEM FW is copied 714 to area 2 704 of PMEM RAM 404. During this transition, PMEM FW loaded into area 1 702 is still being used by PMEM controller 402. During a transition from phase 2 708 to phase 3 710, while running version M of PMEM FW from area 1 702, the new version M+1 of PMEM FW in area 2 704 is used to establish 716 critical handlers for new version M+1. The critical handlers of version M are no longer being used during phase 3 710. In phase 3 710 both areas of PMEM RAM 404 are being used by PMEM controller, but for non-overlapping functions. During a transition from phase 3 710 to phase 4 712, PMEM controller 402 switches 718 from using version M of PMEM FW to version M+1 of PMEM FW. In phase 4 712, version M+1 in area 2 704 of PMEM RAM 404 is now used by the PMEM controller, and version M in area 1 702 of PMEM RAM 404 is no longer used by the PMEM controller. Thus, embodiments show how the transition from one version of PMEM FW to another is accomplished using two areas of PMEM RAM (with each area being large enough to store the respective PMEM FW images). In some embodiments, the size of the two successive versions of PMEM FW are not the same, but the total size of the two successive versions of PMEM FW fit in PMEM RAM 402.

Figure 8:
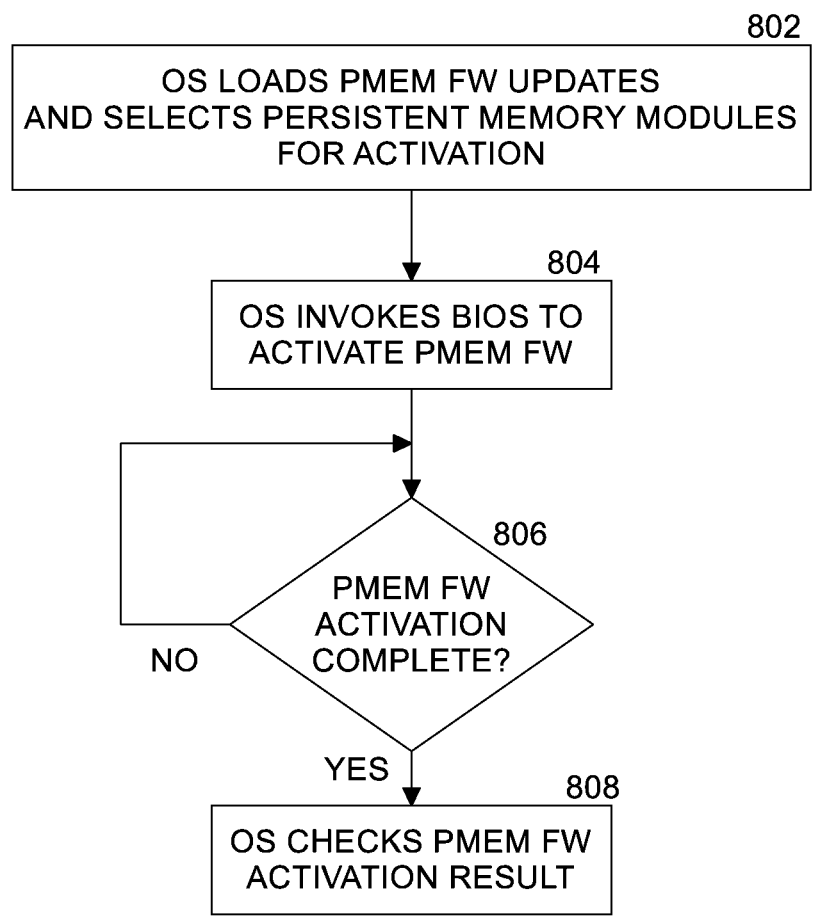
FIG. 8 is a flow diagram of operating system (OS) processing according to some embodiments.

FIG. 8 is a flow diagram 800 of OS 106 processing according to some embodiments. At block 802, the OS loads PMEM FW updates and selects persistent memory modules 116 for activation (e.g., with the updated PMEM FW). In one embodiment, a user invokes a OS utility including or pointing to the new version of the PMEM FW image. In another embodiment, a life cycle management agent gets the new PMEM FW image from a life cycle management service and invokes OS services to update the PMEM FW. In another embodiment, a life cycle management service in BMC 132 communicates with the persistent memory module through an out-of-band (OOB) interface, stages the new PMEM FW and invokes an OS service to activate the new version of the PMEM FW. OS 106 and/or BIOS 110 (in one embodiment, the OS can download the PMEM FW image; in another embodiment the BIOS can download the PMEM FW image; in yet another embodiment, BMC 132 can download the PMEM FW image) downloads the PMEM FW to PMEM flash memory in one or more persistent memory modules 116. At block 804, in one embodiment the OS invokes BIOS 110 to activate the PMEM FW (e.g., the new version). In another embodiment, the OS communicates directly with the persistent memory module (PMEM 400) to activate the PMEM FW. At block 806, the OS checks if PMEM FW activation is complete. If not, the OS checks again at a later point in time. If PMEM FW activation is complete, at block 808, the OS checks the PMEM FW activation result. In an embodiment, if an error occurred, the OS may retry the PMEM FW update.

Figure 9:
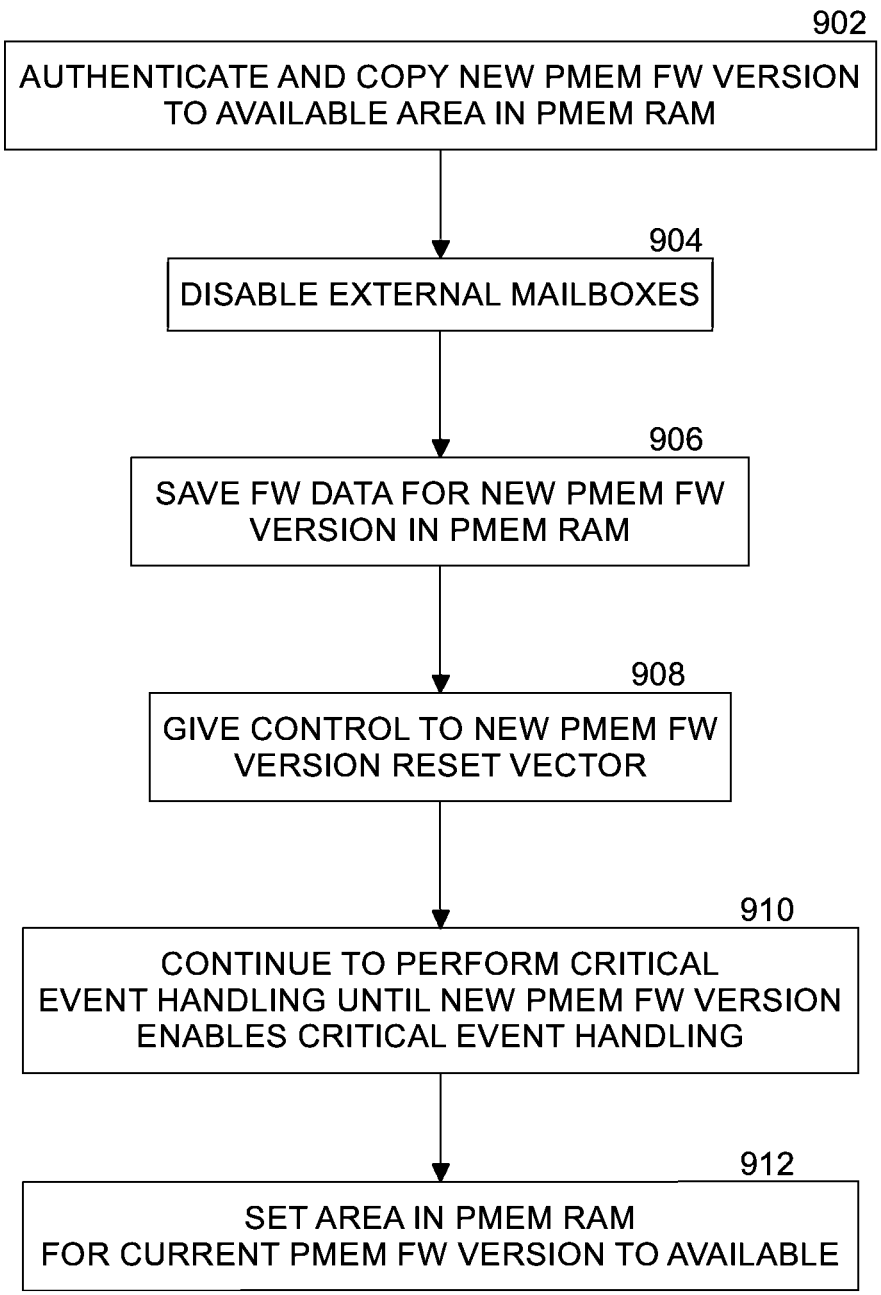
FIG. 9 is a flow diagram of processing of a current version of persistent memory module firmware (PMEM FW) according to some embodiments.

FIG. 9 is a flow diagram 900 of processing of a current version of persistent memory module firmware (PMEM FW) 410 according to some embodiments. While running the current version of PMEM FW (e.g., in phase 1 706 of FIG. 7), at block 902 PMEM controller 402 authenticates and copies the new version of the PMEM FW from PMEM flash memory 408 to an available area (e.g., area 2 704) of PMEM RAM 404. In an embodiment, block 902 may make use of immutable code stored in PMEM ROM 406 to authenticate and copy the new version in separate modules (or in some embodiments, even smaller chunks). In one embodiment, BMC 132 communicates with persistent memory module 116 to activate PMEM FW during runtime of the computing system. This embodiment requires enabling and activation of PMEM FW updates by the BMC. At block 904, PMEM controller 402 disables external mailboxes (and other non-critical event handling tasks) and returns a busy signal on any mailbox accesses. At block 906, PMEM controller saves FW data for the new version of the PMEM FW in PMEM RAM 404 (e.g., in area 2 704). In an embodiment, this FW data includes any FW or HW state information such as configuration policies, SMART information, wear level information, read/write disturb information, errors, security settings, power management settings, etc., that are needed for the new version of PMEM FW.

At block 908, control is given to the new version of the PMEM FW. In an embodiment this is done by using the reset vector for the new version. Microcontrollers generally have only one reset vector from where the microcontroller starts fetching code for execution. However, in one embodiment, persistent memory module 400 may include logic outside the PMEM controller 402 that could switch the address space that is seen by the PMEM controller after power up. For example, assume the PMEM controller starts executing from address 0x4000. If persistent memory module 400 includes chipset logic that by default has a linear mapping where address 0x4000 appears as 0x4000 to the processor and if a selected bit is set, the chipset logic could make address 0x8000 appear to be in the address 0x4000 location. Even though PMEM controller 402 has one reset vector, in an embodiment firmware could be designed such that the PMEM controller has two reset vectors. One reset vector can be used for a cold reset or a PMEM controller reset and another reset vector can be used for new firmware activation reset vector. Embodiments support both models.

Figure 10:
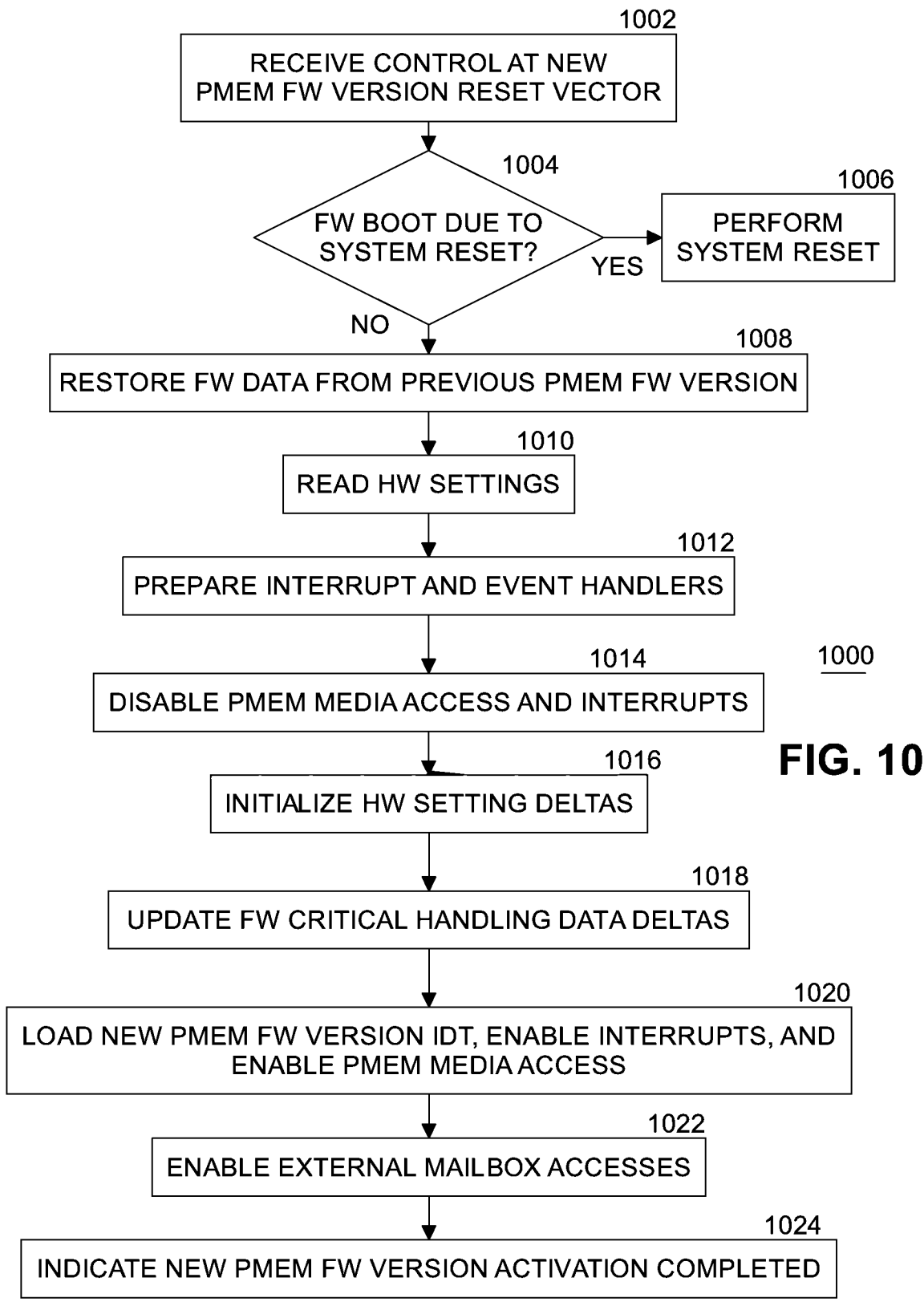
FIG. 10 is a flow diagram of processing of a new version of PMEM FW according to some embodiments.

New version of PMEM FW processing is described in FIG. 10.

At block 910, PMEM controller 402 continues to perform critical event handling (including memory media access, wear leveling, read/write disturb, power loss handling, etc.) using the current version of the PMEM FW until the new version of the PMEM FW is enabled for critical event handling. Once critical event handling is performed by PMEM controller using the new version of the PMEM FW, at block 912 PMEM controller 402 sets the area in PMEM RAM 404 (e.g., area 1 702) for the current version of PMEM FW to available. This part of PMEM RAM 404 can now be reused for future FW updates.

FIG. 10 is a flow diagram 1000 of processing of a new version of PMEM FW according to some embodiments. At block 1002, PMEM controller 402 receives control at the reset vector 512 of the new version of the PMEM FW (e.g., PMEM controller starts executing the new version of the PMEM FW instead of the current version). At block 1004, the PMEM controller checks if the initialization (e.g., boot) of the new version of PMEM FW is due to a memory device reset (generally due to a computing system reset). If the boot is due to a memory device reset, then the PMEM controller performs a system reset at block 1006. Otherwise, the PMEM controller skips reset-related FW processing and continues with the new PMEM FW activation steps. At block 1008, PMEM controller 402 restores the FW data stored by the previous version of the PMEM FW. In an embodiment, the PMEM controller converts the FW data if needed to transfer the FW state from the previous version to the new version. At block 1010, the PMEM controller reads HW settings. This allows the PMEM to reduce HW access needed to reprogram any new settings by the new version of the PMEM FW. There are two methods to initialize the HW settings by new firmware. One method is to reset the persistent memory module and initialize the settings again, and another method is to not reset the entire persistent memory module, check the HW delta settings that need to be programmed and reset only a subset of the persistent memory module or selected registers that need to be reprogrammed. In embodiments, both methods could be applied; the second method uses less time to initialize the persistent memory module if the delta changes are few.

At block 1012, the PMEM controller prepares interrupt and event handlers (but does not yet enable them). HW interrupts generally are sent to a fixed location or a location specified by the Interrupt Redirection Table (IDT). The preparation step includes copying the right interrupt routine to the location pointed by the IDT before enabling interrupts. Once interrupts are enabled, interrupt may be raised immediately, hence the handlers must be ready. Another preparation task is initializing the data structures needed by the new firmware. The new firmware may have its own data structures and may require some data from previous firmware versions (such as number of read/write count and wear-level count).

At block 1014, disables PMEM media access (e.g., to PMEM media 1 412, PMEM media 2 414, . . . PMEM media K 416) and interrupts. This step "back pressures" the host memory accesses from PMEM 400.

At block 1016, HW setting deltas are initialized. New PMEM FW may contain HW bug fixes or only SW related bug fixes. When new firmware is brought online, either the firmware could re-initialize the HW settings or the new firmware could only determine the delta between previously initialized HW settings and apply only the newly changed HW settings. Embodiments support both mechanisms. In one embodiment, new FW takes over old FW and re-initializes the HW settings. In another embodiment, new FW reads the current HW settings and performs only delta operations if it is safe to program the HW without needing to re-initialize all the HW settings.

At block 1018, any FW critical handling information such as data deltas are updated. PMEM FW generally contains the data items to keep track of various operations. For example, data items could have wear-level count, corrected error count, shutdown count, etc. New PMEM FW might include some additional data items such as uncorrected error count. Thus, the new PMEM FW could include additional data blocks, and the format of new data structures may be different from previous PMEM FW versions. The new PMEM FW will look at the previous firmware data structure versions and copy the data to new data structures with any necessary updated data structure revisions. Embodiments include a mechanism to move data from one format to another.

At block 1020, PMEM controller 402 loads a new interrupt description table (IDT) for the new version of the PMEM FW, enables interrupts, and enables PMEM media access. The memory media is then active and critical interrupts and events are handled by the new version of the PMEM FW. At block 1022, PMEM controller 402 enables external mailbox accesses, thereby allowing the new version of the PMEM FW to handle all interrupts and events. At block 1024, completion of activation of the new version of PMEM FW is indicated (referring back to block 806 of FIG. 8).

In an embodiment, blocks 902, 904, and 906 are performed during transition from phase 1 706 to phase 2 708, blocks 908 through 1018 are performed during a transition from phase 2 708 to phase 3 710, and blocks 1020 through 1024 are performed during a transition from phase 3 710 to phase 4 712.

In some environments the size of the total available space in PMEM RAM 404 is less than or equal to twice the size of PMEM FW 410 (including all PMEM FW modules constituting the PM FW image). In another embodiment, a small "side kernel" FW module performs critical event handling capabilities and provides new FW version copy functionality. In this embodiment, the side kernel is part of the new version of PMEM FW that gets authenticated and copied to the PMEM RAM area during the new version of PMEM FW load process. The side kernel is built such that the side kernel can be run from a "scratch" PMEM RAM area. Generally, a scratch PMEM RAM area is designated by the PMEM FW to allow for validation of hardware/firmware functionality, error injection, etc. This area can be made available during activation of the new version of the PMEM FW and the PMEM controller makes use of this scratch area to activate new version.

Figure 11:
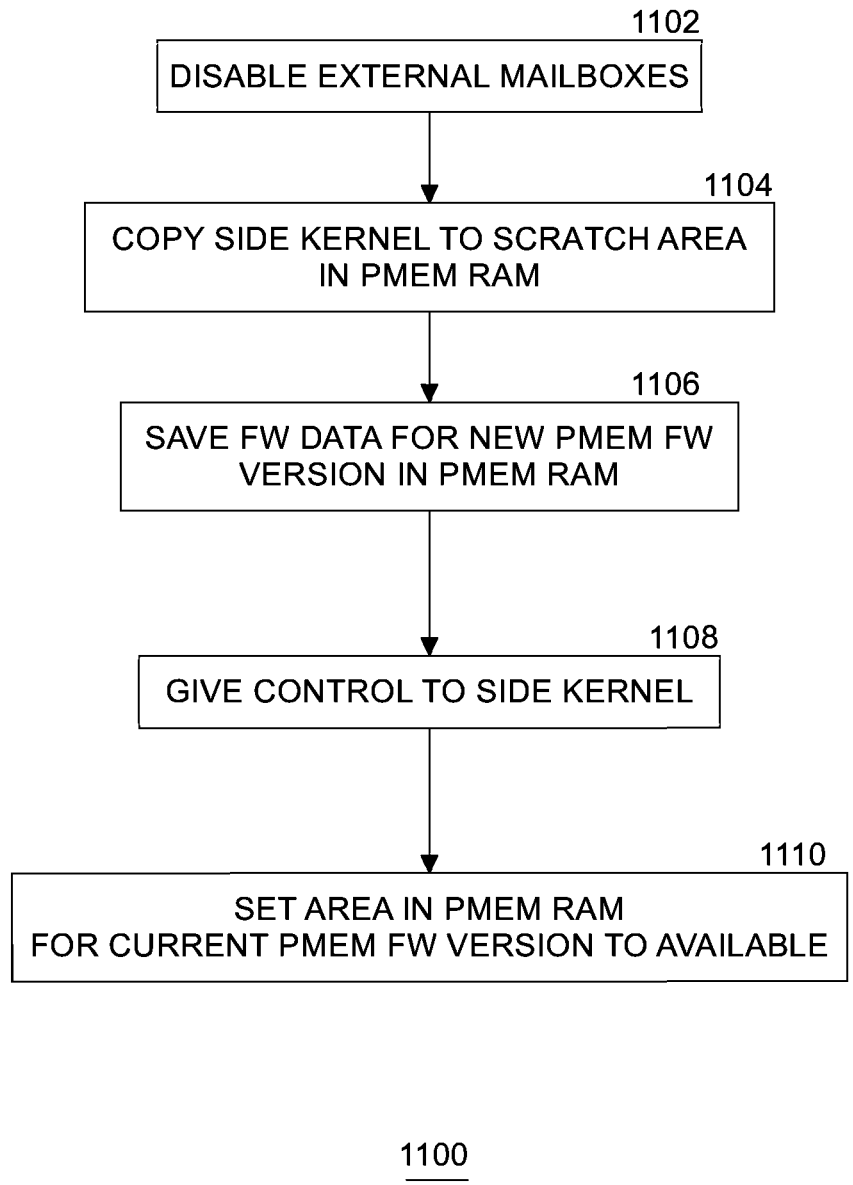
FIG. 11 is a flow diagram of processing of a current version of PMEM FW according to some embodiments.

FIG. 11 is a flow diagram 1100 of processing of a current version of PMEM FW according to some embodiments. At block 1102, PMEM controller 402, while executing the current version of PMEM FW, disables external mailboxes and returns a busy status on any mailbox accesses. At block 1104, PMEM controller copies the side kernel code to a scratch area in PMEM RAM 404. At block 1106, PMEM controller saves FW data for use by the new version of PMEM FW in PMEM RAM 404. Interrupts are disabled and control is then given at block 1108 to the side kernel. Side kernel processing is described in FIG. 12.

Figure 12:
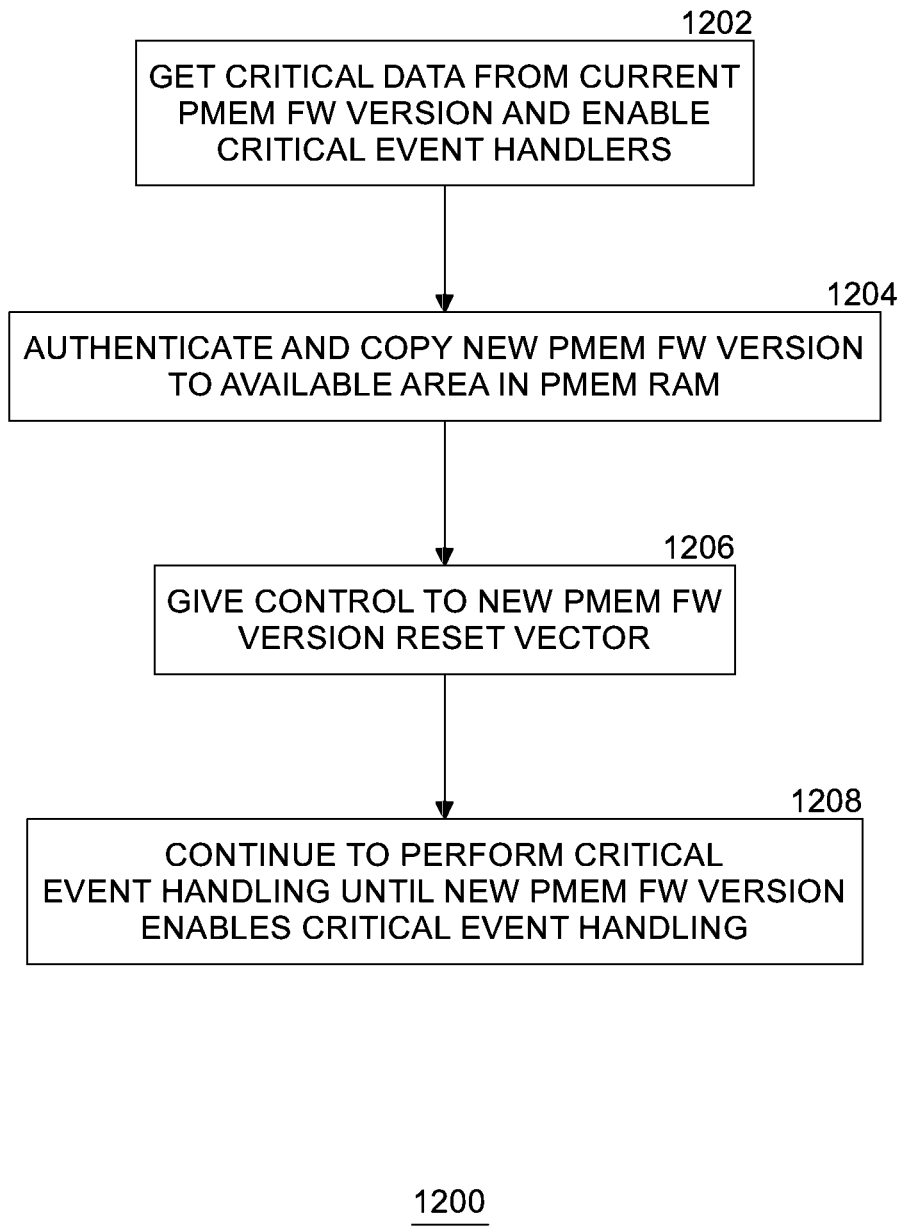
FIG. 12 is a flow diagram of processing of a side kernel of a current version of PMEM FW according to some embodiments.

FIG. 12 is a flow diagram 1200 of processing of a side kernel of a current version of PMEM FW according to some embodiments. Once control is given to the side kernel FW module, at block 1202 the side kernel gets critical data from the current version of the PMEM FW previously stored in the PMEM RAM and enables critical event handlers. This switches handling of critical interrupts and events to the side kernel from the current version of the PMEM FW, but memory media access is still enabled. In an embodiment, the side kernel clears the area in PMEM RAM where the current version of the PMEM FW is stored. At block 1204, the PMEM controller (running the side kernel FW) authenticates and copies the new version of the PMEM FW to an available area in PMEM RAM 404. In one embodiment, the area cleared is the same area that is written to with the new version of the PMEM FW. In an embodiment, this step may make use of the immutable ROM code to authenticate and copy the new PMEM FW in small chunks. At block 1206, control is given to the new version of the PMEM FW using the reset vector. Processing for the new version of the PMEM FW continues as described on FIG. 10. At block 1208, the side kernel continues to perform critical event handling until the new version of the PMEM FW enables critical event handling.

Returning back to FIG. 11, at block 1110, PMEM controller 402 sets the area in PMEM RAM 404 for the current version of the PMEM FW to available (e.g., for loading of future new versions of PMEM FW).

In another embodiment, instead of duplicating the critical handler functionality in the side kernel and in the new version of the PMEM FW, the critical handler functionality is built as separate relocatable module accessible by both the side kernel and the new version of the PMEM FW. During the firmware activation processes, the side kernel containing the critical handler and FW copy functionality is re-located to the scratch area in the PMEM RAM. Then the same steps are performed as described in FIGS. 11 and 12. This embodiment provides for the reduction of the PMEM RAM size needed to store the side kernel, but the immutable ROM authentication processing is performed as described above.

Figure 13:
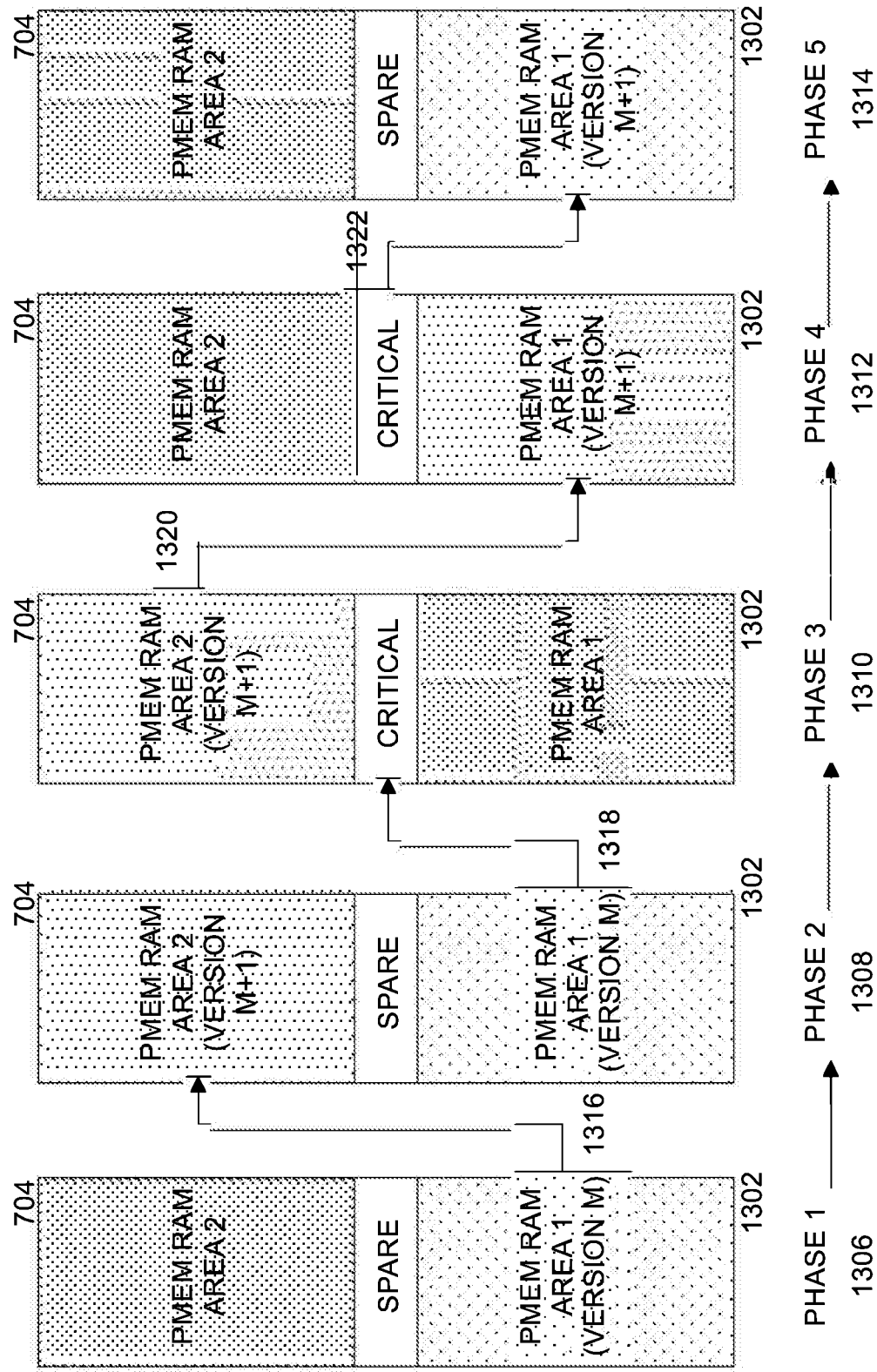
FIG. 13 illustrates an example of a storage medium.

FIG. 13 is a diagram of persistent memory module random-access memory (RAM) changes over time according to some embodiments. In one embodiment, the size of the total available space in PMEM RAM 404 is more than twice the size of PMEM FW 410 (including all PMEM FW modules constituting the PM FW image). In this embodiment, a spare area of PMEM RAM is used to stage and run critical event handlers and PMEM FW activation functions of an existing version. In this embodiment, the copy time is faster when the copy is staged from one image in PMEM RAM to another, instead of from flash memory to RAM. An advantage of this embodiment is that position dependent code can be used rather than position independent code. With position dependent code, direct variables and/or function calls can be accessed, although position dependent code requires using a "position+offset" for accesses to variables or functions calls. This may reduce the additional overhead when using position dependent code, thereby resulting in better overall performance.

During phase 1 1306, a version M of PMEM FW 410 has been stored into area 1 1302 of PMEM RAM 404 and is executed by PMEM controller 402 to operate PMEM 400. During phase 1 1306, area 2 1304 of PMEM RAM 404 is unused. During a transition from phase 1 1306 to phase 2 1308, a new version M+1 of PMEM FW is copied 1316 to area 2 1304 of PMEM RAM 404 and to PMEM flash memory 408. During this transition, PMEM FW loaded into area 1 1302 is still being used by PMEM controller 402. During a transition from phase 2 1308 to phase 3 1310, while running version M of PMEM FW from area 1 1302, critical handlers of version M are established in a spare area 1324 of PMEM RAM. During a transition from phase 3 1310 to phase 4 1312, PMEM controller 402 copies PMEM FW version M+1 to firmware RAM area 1 1302, while critical handlers of version M are running from the spare area. During a transition 1322 from phase 4 1312 to phase 5 1314, control is given to PMEM FW version M+1 stored in firmware RAM area 1 1302. In phase 5 1314, version M+1 in area 1 1302 of PMEM RAM 404 is now used by the PMEM controller. Thus, embodiments show how the transition from one version of PMEM FW to another is accomplished using two areas of PMEM RAM (with each area being large enough to store the respective PMEM FW images), and a spare area. In some embodiments, the size of the two successive versions of PMEM FW are not the same, but the total size of the two successive versions of PMEM FW fit in PMEM RAM 402. In an embodiment, the size of the spare area must be large enough to store the critical event handlers and FW activation functions.

Figure 14:
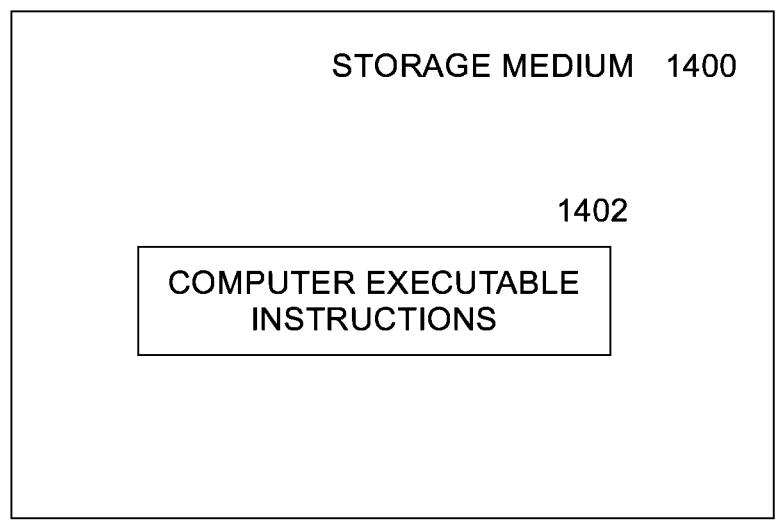
FIG. 14 illustrates an example computing platform.

FIG. 14 illustrates an example of a tangible storage medium 1400. Storage medium 1300 may comprise an article of manufacture. In some examples, storage medium 1400 may include any non-transitory computer readable medium or machine readable medium, such as an optical, magnetic or semiconductor storage. Storage medium 1400 may store various types of computer executable instructions, such as instructions 1402 to implement logic flows described above. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 15:
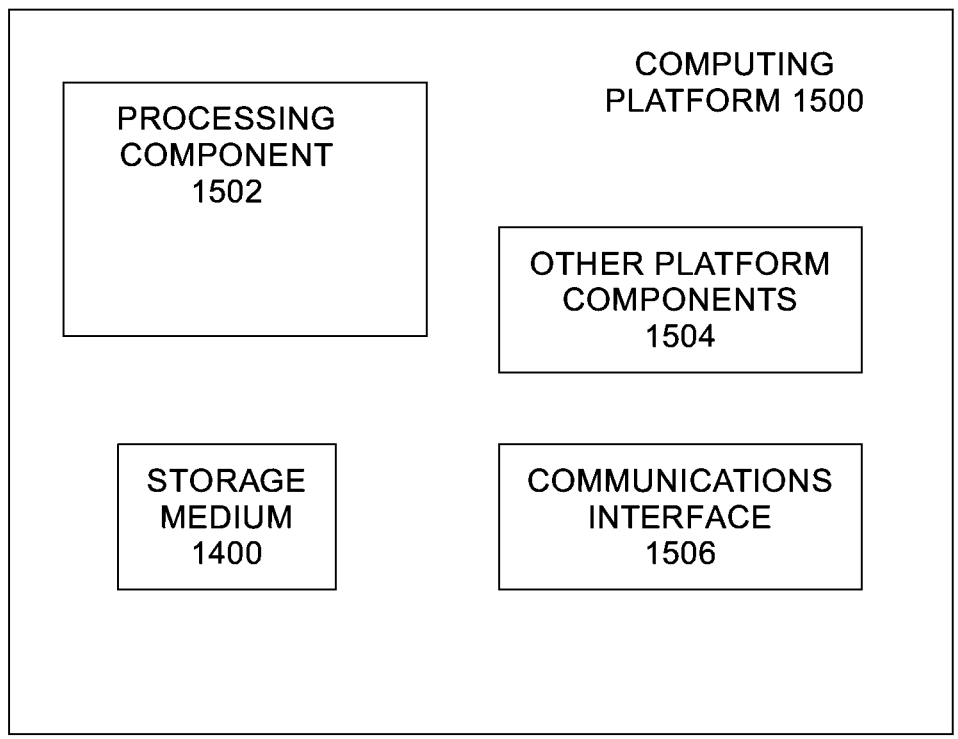
FIG. 15 illustrates an example computing platform.

FIG. 15 illustrates an example computing platform 1500. In some examples, as shown in FIG. 15, computing platform 1500 may include a processing component 1502, other platform components 1504 and/or a communications interface 1506.

According to some examples, processing component 1502 may execute processing operations or logic for instructions stored on storage medium 1400. Processing component 1502 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chipsets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 1504 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), types of non-volatile memory such as 3D crosspoint memory that may be byte or block addressable. Non-volatile types of memory may also include other types of byte or block addressable non-volatile memory such as, but not limited to, multi-threshold level NAND flash memory, NOR flash memory, single or multi-level PCM, resistive memory, nanowire memory, FeTRAM, MRAM that incorporates memristor technology, STT-MRAM, or a combination of any of the above. Other types of computer readable and machine-readable storage media may also include magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 1506 may include logic and/or features to support a communication interface. For these examples, communications interface 1506 may include one or more communication interfaces that operate according to various communication protocols or standards to communicate over direct or network communication links or channels. Direct communications may occur via use of communication protocols or standards described in one or more industry standards (including progenies and variants) such as those associated with the peripheral component interconnect express (PCIe) specification. Network communications may occur via use of communication protocols or standards such those described in one or more Ethernet standards promulgated by the Institute of Electrical and Electronics Engineers (IEEE). For example, one such Ethernet standard may include IEEE 802.3. Network communication may also occur according to one or more OpenFlow specifications such as the OpenFlow Switch Specification.

The components and features of computing platform 1500, including logic represented by the instructions stored on storage medium 1400 may be implemented using any combination of discrete circuitry, ASICs, logic gates and/or single chip architectures. Further, the features of computing platform 1500 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 1500 shown in the block diagram of FIG. 15 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASIC, programmable logic devices (PLD), digital signal processors (DSP), FPGA, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Included herein are logic flows or schemes representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow or scheme may be implemented in software, firmware, and/or hardware. In software and firmware embodiments, a logic flow or scheme may be implemented by computer executable instructions stored on at least one non-transitory computer readable medium or machine readable medium, such as an optical, magnetic or semiconductor storage. The embodiments are not limited in this context.

Some examples are described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A persistent memory module comprising:
a random-access memory (RAM);
a flash memory;
a plurality of persistent memory media; and
a controller; the controller to
copy a new version of persistent memory module firmware from the flash memory into an available area of the RAM;
transfer processing of a current version of persistent memory module firmware to the new version of persistent memory module firmware during runtime of a computing system, without a reset of the computing system and without quiesce of access to the plurality of persistent memory media, while continuing to perform critical event handling by the current version of persistent memory module firmware by:
establishing the critical event handling by the current version of the firmware in a spare area of the RAM distinct from the available area of the RAM;
initialize the new version of persistent memory module firmware; and
transfer processing of critical event handling from the current version of persistent memory module firmware to the new version of persistent memory module firmware when initializing the new version of persistent memory module firmware is completed.
2. The persistent memory module of claim 1, comprising the controller to:
authenticate the new version of persistent memory module firmware prior to executing the new version of persistent memory module firmware.

3. The persistent memory module of claim 1, wherein the controller to transfer processing to the new version of persistent memory module firmware comprises the controller to:
  disable external mailbox accesses for the persistent memory module;
  save persistent memory module state information in the persistent memory module RAM for the new version of persistent memory module firmware; and
  give control to the new version of persistent memory module firmware using a reset vector of the new version of persistent memory module firmware.

4. The persistent memory module of claim 1, comprising the controller to:
  set an area in the RAM storing the current version of persistent memory module firmware to available after transferring processing of critical event handling from the current version of persistent memory module firmware to the new version of persistent memory module firmware.

5. The persistent memory module of claim 1, wherein the controller to perform critical event handling comprises the controller to control access to the persistent memory media in the persistent memory module, manage wear leveling of the persistent memory media, and perform power loss handling for the persistent memory module.

6. The persistent memory module of claim 1, wherein the persistent memory media comprises one or more three-dimensional cross point memories.

7. The persistent memory module of claim 1, wherein the new version of persistent memory module firmware comprises a plurality of firmware modules stored in the flash memory of the persistent memory module, the persistent memory module flash memory including a firmware interface table, each entry in the firmware interface table pointing to a selected one of the plurality of firmware modules, and each firmware module being independently updateable.

8. A method of updating firmware for a persistent memory module in a computing system comprising:
  copying a new version of persistent memory module firmware into an available area of random-access memory (RAM) in the persistent memory module;
  transferring processing of a current version of persistent memory module firmware to the new version of persistent memory module firmware during runtime of the computing system, without a reset of the computing system and without quiesce of access to persistent memory media in the persistent memory module, while continuing to perform critical event handling by the current version of persistent memory module firmware by:
    establishing the critical event handling by the current version of the firmware in a spare area of the RAM distinct from the available area of the RAM;
  initializing the new version of persistent memory module firmware; and
  transferring processing of critical event handling from the current version of persistent memory module firmware to the new version of persistent memory module firmware when initializing the new version of persistent memory module firmware is completed.

9. The method of claim 8, comprising:
  authenticating the new version of persistent memory module firmware prior to executing the new version of persistent memory module firmware.

10. The method of claim 8, wherein transferring processing to the new version of persistent memory module firmware comprises:
  disabling external mailbox accesses for the persistent memory module;
  saving persistent memory module state information in the persistent memory module RAM for the new version of persistent memory module firmware; and
  giving control to the new version of persistent memory module firmware using a reset vector of the new version of persistent memory module firmware.

11. The method of claim 10, wherein the reset vector is one of a cold reset vector and a runtime firmware activation reset vector.

12. The method of claim 8, comprising:
  setting an area in the persistent memory module RAM storing the current version of persistent memory module firmware to available after transferring processing of critical event handling from the current version of persistent memory module firmware to the new version of persistent memory module firmware.

13. The method of claim 8, wherein critical event handling comprises one or more of controlling access to the persistent memory media in the persistent memory module, managing wear leveling of the persistent memory media, and power loss handling for the persistent memory module.

14. The method of claim 8, wherein the persistent memory media comprises one or more three-dimensional cross point memories.

15. The method of claim 8, wherein the new version of persistent memory module firmware comprises a plurality of firmware modules stored in a flash memory of the persistent memory module, the persistent memory module flash memory including a firmware interface table, each entry in the firmware interface table pointing to a selected one of the plurality of firmware modules, and each firmware module being independently updateable.

16. The method of claim 8, wherein initializing the new version of persistent memory module firmware comprises:
  restoring the persistent memory module state information;
  preparing interrupt and event handlers;
  disabling access to persistent memory module media;
  back pressuring host access;
  updating critical handling information;
  enabling interrupts;
  enabling access to the persistent memory module media; and
  enabling external mailbox accesses for the persistent memory module.

17. At least one tangible machine-readable non-transitory medium comprising a plurality of instructions that in response to being executed by a processor cause the processor to:
  copy a new version of persistent memory module firmware into an available area of random-access memory (RAM) in the persistent memory module;
  transfer processing of a current version of persistent memory module firmware to the new version of persistent memory module firmware during runtime of the computing system, without a reset of the computing system and without quiesce of access to persistent memory media in the persistent memory module, while continuing to perform critical event handling by the current version of persistent memory module firmware by:

establishing the critical event handling by the current version of the firmware in a spare area of the RAM distinct from the available area of the RAM;

initialize the new version of persistent memory module firmware; and transfer processing of critical event handling from the current version of persistent memory module firmware to the new version of persistent memory module firmware when initializing the new version of persistent memory module firmware is completed.

18. The at least one tangible machine-readable non-transitory medium of claim 17, comprising a plurality of instructions that in response to being executed by a processor cause the processor to:

authenticate the new version of persistent memory module firmware prior to executing the new version of persistent memory module firmware.

19. The at least one tangible machine-readable non-transitory medium of claim 17, wherein instructions to transfer processing to the new version of persistent memory module firmware comprise instructions to:

disable external mailbox accesses for the persistent memory module;

save persistent memory module state information in the persistent memory module RAM for the new version of persistent memory module firmware; and give control to the new version of persistent memory module firmware using a reset vector of the new version of persistent memory module firmware.

20. The at least one tangible machine-readable non-transitory medium of claim 19, wherein the reset vector is one of a cold reset vector and a runtime firmware activation reset vector.

21. The at least one tangible machine-readable non-transitory medium of claim 17, comprising a plurality of instructions that in response to being executed by a processor cause the processor to:

set an area in the persistent memory module RAM storing the current version of persistent memory module firmware to available after transferring processing of critical event handling from the current version of persistent memory module firmware to the new version of persistent memory module firmware.

22. The at least one tangible machine-readable non-transitory medium of claim 17, wherein instructions to perform critical event handling comprise instructions to control access to the persistent memory media in the persistent memory module, manage wear leveling of the persistent memory media, and perform power loss handling for the persistent memory module.

23. The at least one tangible machine-readable non-transitory medium of claim 17, wherein the persistent memory media comprises one or more three-dimensional cross point memories.

24. The at least one tangible machine-readable non-transitory medium of claim 17, wherein the new version of persistent memory module firmware comprises a plurality of firmware modules stored in a flash memory of the persistent memory module, the persistent memory module flash memory including a firmware interface table, each entry in the firmware interface table pointing to a selected one of the plurality of firmware modules, and each firmware module being independently updateable.

25. The at least one tangible machine-readable non-transitory medium of claim 17, wherein instructions to initialize the new version of persistent memory module firmware comprise instructions to:

restore the persistent memory module state information;
prepare interrupt and event handlers;
disable access to persistent memory module media;
back pressure host access;
update critical handling information;
enable interrupts;
enable access to the persistent memory module media; and
enable external mailbox accesses for the persistent memory module.

\* \* \* \* \*